United States Patent [19]

Sander

[11] 4,278,349
[45] Jul. 14, 1981

[54] FIBER OPTICAL TEMPERATURE SENSORS

[75] Inventor: Lars Sander, Vesteras, Sweden

[73] Assignee: Asea Aktiebolag, Vesteras, Sweden

[21] Appl. No.: 51,458

[22] Filed: Jun. 22, 1979

[30] Foreign Application Priority Data

Jun. 26, 1978 [SE] Sweden .................................. 7807199

[51] Int. Cl.³ .......................... G01J 5/28; G01J 5/60; G01K 11/12
[52] U.S. Cl. ........................................ 356/44; 73/356; 356/45
[58] Field of Search ............................. 356/43, 44, 45; 73/355 R, 356

[56] References Cited

U.S. PATENT DOCUMENTS

| 3,910,701 | 10/1975 | Henderson et al. | 356/73 |
| 4,016,761 | 4/1977 | Rozzell et al. | 73/356 |
| 4,075,493 | 2/1978 | Wickersheim | 73/355 R |
| 4,136,566 | 1/1979 | Christensen | 356/44 |
| 4,179,927 | 12/1979 | Saaski | 73/256 |

FOREIGN PATENT DOCUMENTS 2319120 2/1977 France .

Primary Examiner—Vincent P. McGraw
Attorney, Agent, or Firm—Watson, Cole, Grindle & Watson

[57] ABSTRACT

A fiber optical temperature measuring apparatus is based on the ability of certain materials to change color in dependence on changes in temperature. Visible or invisible light having at least two different wavelengths is supplied to the material and the light emanating from the material is detected for determining the changes in the absorption characteristic of the material at the emitted wavelengths by determining the quotient between the detected signals from the material.

14 Claims, 9 Drawing Figures

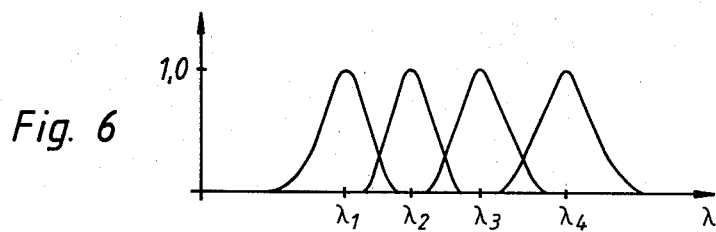
Fig. 6
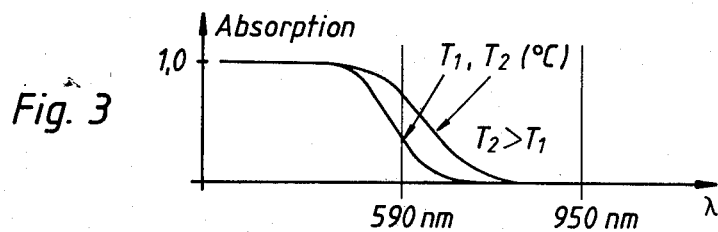
Fig. 3
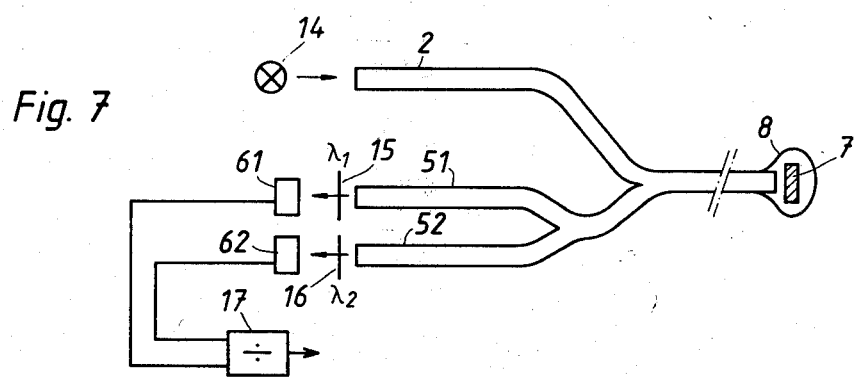
Fig. 7
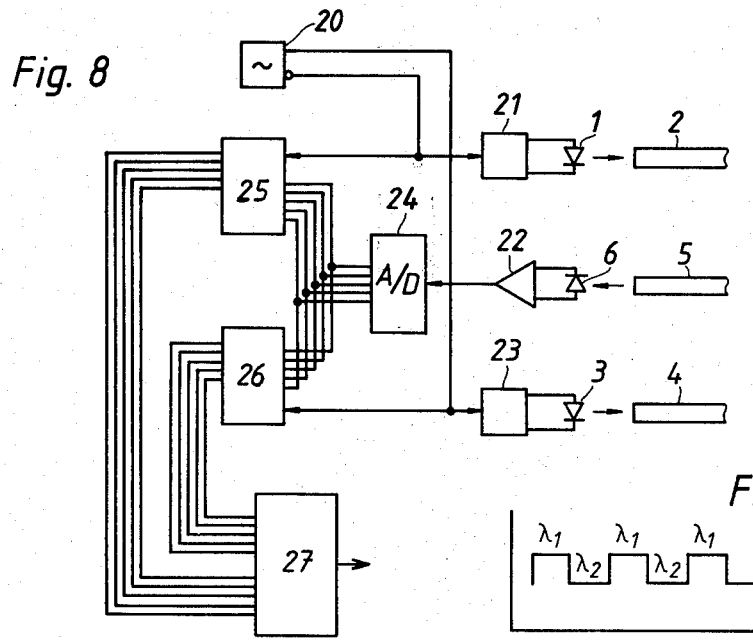
Fig. 8
Fig. 8a

FIBER OPTICAL TEMPERATURE SENSORS

BACKGROUND OF THE INVENTION

1. Field of the Invention

The present invention relates to fiber optical temperature sensors, and more particularly to such sensors which are based on the ability of certain materials to change color in dependence on temperature. This applies not only to visible light, but generally also to non-visible light such as ultraviolet and infrared radiation.

2. Prior Art

In many applications of temperature measurement, it is of great interest to be able to use a non-electrical method involving light transmission through optical fibers. Such applications are particularly advantageous in explosive environments or in areas with strong electrical or magnetic fields. It is known to use fiber optical thermometers, where the temperature-dependent expansion of a body is allowed to influence light transmission in a fiber optical system. In such a known sensor, light is reflected from a fiber transmitting light against the concave surface of a fluid located in a container, the fluid being subjected to the temperature to be measured. Through temperature variations the distance of the concave surface from the fiber end is changed and influences the light in a fiber extending from the sensor.

A sensor of the above-mentioned kind has at least the disadvantage that it cannot be located at any random place without taking special measures. Another disadvantage is that it is not possible to distinguish the change in light transmission, caused by the temperature, from other attenuations which may occur. Such undesirable attenuations may occur if the fiber is bent, or by a joint in the fiber. For example, a fiber having a diameter of 400 microns may show a transmission loss of 40% in case of a bend with a radius of 10 to 30 mm. In practice, therefore, such a sensor must be calibrated with a known temperature after it has been positioned in the measuring object. This can be difficult or even impossible, for example inside the winding in an electrical machine or transformer. This disadvantage becomes even more pronounced where the optical fiber may be subjected to uncontrollable deformation during the measurement.

SUMMARY OF THE INVENTION

According to the present invention, the effect of a varying damping in the light conductor system is eliminated. Furthermore, the sensor has no movable parts and can be constructed with a single optical fiber as a measuring channel.

The invention is based on a material having a spectral absorption capacity in that its color changes with changing temperature and which is applied to a fiber optical system. The material is arranged to be subjected to the temperature that is to be measured, and optical fibers are used for transmitting light to the material and for transmitting at least part of the light not absorbed by the material. The temperature-sensing material used has a temperature-dependent transition from high to low absorption in the absorption spectrum, a so-called absorption edge. The sensor is provided with means for optical sensing of the absorption edge such that the absorption capacity of the material is determined at least at two different wavelength ranges of the light transmitted to the material. Further, the sensor includes means for evaluating the signals obtained during the optical sensing. In principle, the measurement can be carried out such that the temperature-dependence of the absorption capacity is derived either from the spectral reflecting capacity of the material or from its spectral transmitting capacity. In the latter case detection of the emitted light takes place after it has passed through the material. Because the measurement is performed with light within several wavelength ranges—also non-visible light can be used—the color is determined as a relative concept. In this way the dependence on the absolute level of the absorption capacity of the temperature-sensing material is avoided.

In the simplest embodiment the color determination is made in two wavelength ranges, but in order to increase the precision of the measurement there may be more than two ranges. The separation of the wavelengths can be done at the light source, for example by using light-emitting diodes with different wavelengths, i.e. narrow-band light. Another method is to use a broad-band light source and achieve the spectral dependence with the help of filters. The filtering can also be accomplished on the detector side, either by using detectors having mutually different spectral-dependent sensitivity, or detectors of the same type provided with different filters. These filters can also be mounted movably and rotate in front of the light source or the detector, which are both broad-band devices.

The fiber optical ray path can be designed in many ways. A requirement is that the light in the different wavelength ranges should be brought via optical fibers from the light source or the light sources to the temperature-sensitive material. After reflection from, or transmission through, the material, the light is passed to the detector or the detectors via optical fibers.

BRIEF DESCRIPTION OF THE DRAWINGS

FIG. 3 shows the dependence of the absorption characteristics of temperature sensitive material on the light wavelength;

FIG. 6 shows light transmission characteristics for a number of different light wavelengths;

FIG. 7 shows a temperature sensing device with a broad-band light source and filters at the detectors;

FIG. 8 shows an exemplary electronic system for use in the temperature sensing devices of the invention; and FIG. 8a shows a signal in the circuitry of FIG. 8.

DETAILED DESCRIPTION

Figure 1:
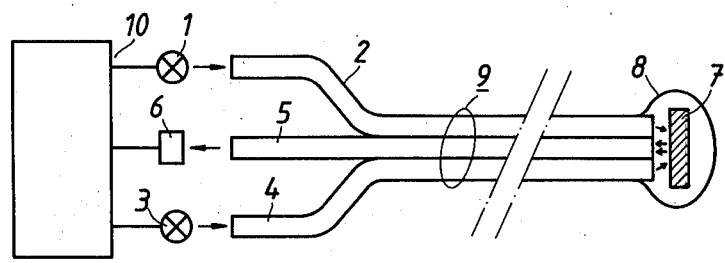
FIGS. 1 and 2 show the use of two separate light sources in respective embodiments of the invention.

If the light transport takes place in several fibers, they are assembled in the same cable, so as to be exposed to the same deflections. FIG. 1 shows that the light from light source 1 is conducted into optical fiber 2 and the light from light source 3 is conducted into optical fiber 4. Optical fibers 2 and 4 are assembled together with optical fiber 5, which cooperates with detector 6, to conduct light to temperature-sensing material 7, which is attached to the end of fiber cable 9 by means of glue 8 or the like. Light sources 1 and 3 and detector 6 are connected to electronics unit 10, which controls the light sources and evaluates the light coming from the detector. Electronics unit 10 will be described in more detail below.

Temperature-sensing material 7 can be enclosed in a casing of glass, rubber or a similar material. If a glass-enclosed material is attached directly to the optical fiber ens, a reduction in the fiber end surfaces' reflexes is obtained, since the material on both sides of the end surfaces has substantially the same refraction index.

Figure 2:
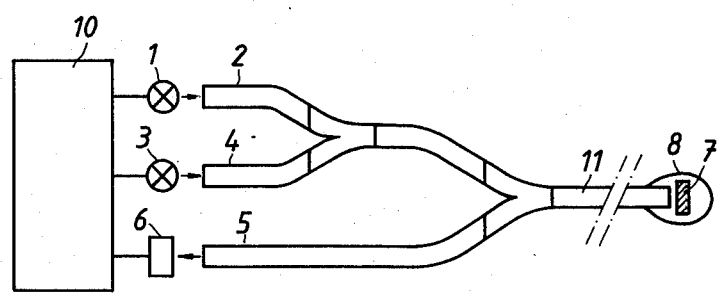
Figure 4:
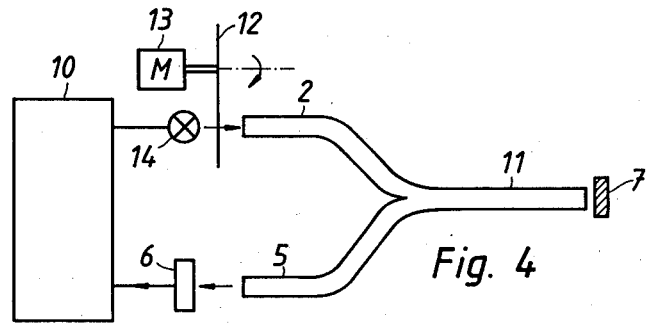
FIG. 4 shows a temperature sensing device with a rotatable filter.

Temperature-sensing material 7 may be attached to the fiber ends, as shown in FIGS. 1 and 2, or be freely arranged in relation to the fiber end, as shown in FIG. 4. In the latter case, material 7, possibly enclosed in some transparent casing, may be arranged on a part which is movable with respect to the fiber end. One practical application among several is measurement of the temperature in rotating machine components, for example in the rotor of an electrical machine. Temperature-sensing material 7 is then placed on the machine part, for example a winding coil, the temperature of which is to be measured. Optical fiber 11 is arranged so that it may illuminate the material for at least part of a turn of rotation.

Alternatively, a reflecting surface can be arranged behind the temperature-sensing material. The radiation which has passed through the material is reflected against the reflecting surface into the material and again passes through the material to a fiber transmitting the light. The radiation which is received by the detector has thus been transmitted through the material.

A suitable embodiment of the fiber system, as shown by FIG. 2, is to let both the incoming and the outgoing light to be transmitted in common fiber 11. The branchings of the light conductors are performed with known techniques.

In a practical embodiment of the invention according to FIGS. 1 and 2, light sources 1 and 3 each consist of light-emitting diodes having wavelengths of 590 and 950 mm, respectively. Detector 6 consists of a silicon photo-diode, which has a high sensitivity to such wavelengths. The optical fiber may consist of commercially available step-index fiber, for example Quartz-Silice 400 micron fiber.

Temperature-sensitive material 7 which covers the end surface of the fiber must be chemically stable and have a reversible color change. Material 7 may consist of a metal oxide, for example iron oxide, or a coloring pigment, such as red lead. It may also be polycrystalline, crystalline, amorphous, or polymeric, an insulator, semiconductor, or a ceramic. Material 7 may be doped to obtain the desired shape of the absorption edge, or composed of pulverized basic components with different band gaps or noise levels to achieve a certain definite shape of the absorption edge. GaAs is a typical example of a suitable semiconductor material. Temperature-sensitive material 7 may also be included as a constituent in the light conductor material and is then suitably available in particulate form. It can be included in the core of the light conducting fiber, or in the mantle, or in both the core and the mantle.

FIG. 3 schematically shows the dependence of the absorption on the wavelength $\lambda$ at two different temperatures for such a temperature sensitive material (red lead). As can be seen, the absorption curve shows a marked transition from a high to a low absorption at an increasing wavelength and then forms a so-called absorption edge. The wavelengths 590 and 950 mm are shown and the diagram also shows that the absorption curve is substantially constant at 950 mm but varies considerably in the range around 590 mm. The absorption edges for two different temperatures $T_1$, $T_2$ are shown, $T_2$ being greater than $T_1$. The temperature curves show that in the range around $\lambda = 590$ mm, the absorption increases considerably with increasing temperature. Alteration of the absorption characteristic, i.e. the displacement of the absorption edge at a certain wavelength, can therefore be used as a measure of the alteration of the temperature of the material.

Figure 5:
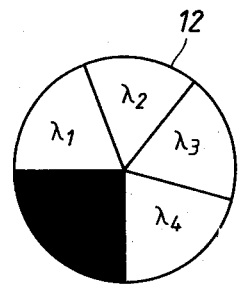
FIG. 5 shows a possible division of a filter disc.

There is no requirement that the light sources should have narrow bands. FIG. 4 shows an arrangement with filter disc 12 driven by motor 13 and located between broad-band light source 14 and optical fiber 2. Filter disc 12, which is shown in FIG. 5, is divided into a number of light transmitting sectors with different wavelength ranges $\lambda_1$, $\lambda_2$, $\lambda_3$, $\lambda_4$. One sector can be made impermeable to light. FIG. 6 shows the spectral distribution for the different wavelength ranges, which can also overlap each other. If the light source 14 transmits white light and filter disc 12 has the structure and characteristics according to FIGS. 5 and 6, the signals from detector 6, which are connected to the respective filter on the receiver side, will have different temperature dependence. Different combinations of filters can be used for different temperature ranges, or alternatively a weighted addition of the outputs from many filters can be used to increase the accuracy.

FIG. 7 shows the use of broad-band light source 14 and two detectors 61, 62, respectively, each having a filter 15, 16, respectively, and a wavelength range $\lambda_1$ and $\lambda_2$, respectively. The output signals from detectors 61, 62 are supplied to quotient former 17, the output signal of which becomes dependent on the temperature of temperature-sensitive material 7.

FIG. 8 shows an example of electronic equipment for the temperature sensor. Oscillator 20 controls two light-emitting diodes 1, 3 through drive circuits 21, 23, so that the light-emitting diodes are alternately energized. Photo-diode 6, which is sensitive to both wavelengths, supplies a signal via amplifier 22, which signals is proportional to the reflecting capability at the respective wavelengths. The appearance of the signal is clear from FIG. 8a. This signal is converted in A/D convertor 24 into digital form. Oscillator 20 also controls two registers 25, 26, so that the digital signal for the respective wavelength is stored on one register each. The contents of the registers are supplied to digital circuit 27, which forms the quotient between the contents of the registers and provides an output signal which can be translated into the scanned temperature. Circuit 27 may be an IC circuit, a microprocessor, a computer, etc.

If the transmission in the measuring fiber is changed, for example by the fiber being deflected or deformed in some other way, the signals for the respective wavelengths will be changed to an equal extent calculated as a percentage, and the quotient is not changed.

A measurement system according to the invention can be used from 0° C. to 500° C. It should be noted, however, that the optical fiber must be wholly enclosed in glass for the higher temperatures, above 250° C. or so.

What is claimed is:

1. Temperature measuring apparatus, comprising: material forming a sensor and including a coloring pigment having spectral absorption characteristics with a temperature-dependent transition from a high to a low absorption characteristic over a range of optical wavelengths, said material being subjected to the temperature to be measured;

optical fibers for transmitting light at least at two wavelengths, with at least one of said wavelengths being within said range of optical wavelengths, to said temperature-dependent material and for transmitting light representative of said temperature-dependent transition at each of said at least two wavelengths from said material;

means for optically sensing said transmitted light from said temperature-dependent material by said optical fibers and generating signals representative thereof; and means for determining temperature from said signals, and including means for comparing the optically sensed temperature transition signals of said at least two wavelength ranges to compensate for variable transmission characteristics in said optical fibers.

2. Temperature measuring apparatus, comprising:

material forming a sensor and including a metal oxide having spectral absorption characteristics wih a temperature-dependent transition from a high to a low absorption characteristic over a range of optical wavelengths, said material being subjected to the temperature to be measured;

optical fibers for transmitting light at least at two wavelengths, with at least one of said wavelengths being within said range of optical wavelengths, to said temperature-dependent material and for transmitting light representative of said temperature-dependent transition at each of said at least two wavelengths from said material;

means for optically sensing said transmitted light from said temperature-dependent material by said optical fibers and generating signals representative thereof; and means for determining temperature from said signals, and including means for comparing the optically sensed temperature transition signals of said at least two wavelength ranges to compensate for variable transmission characteristics in said optical fibers.

3. Measurement apparatus according to claim 1 or 2, wherein the temperature dependence of said spectral absorption characteristic is derived from the spectral reflecting capability of said temperature-dependent material.

4. Measurement apparatus according to claim 1 or 2, wherein the temperature dependence of said spectral absorption characteristic is derived from the spectral transmission capability of said temperature-dependent material.

5. Measurement apparatus according to claim 1 or 2, wherein said means for determining includes means for forming the quotient between the values of the absorption characteristic corresponding to said at least two wavelengths.

6. Measurement apparatus according to claim 1 or 2, wherein said optical means includes a single optical fiber, the end surface of which is located at the measuring point and is covered with said material.

7. Measurement apparatus according to claim 1, wherein said coloring pigment consists of red lead.

8. Measurement apparatus according to claim 2, wherein said material includes iron oxide.

9. Measurement apparatus according to claim 1 or 2, wherein said material is included as part of said optical means and is in particulate form.

10. Measurement apparatus according to claim 1 or 2, further comprising a casing enclosing said material.

11. Measurement apparatus according to claim 1 or 2, wherein said material is mounted to be movable in relation to said optical fibers.

12. Measurement apparatus according to claim 5 further comprising a broad band radiation source and rotatable filter means interposed between said radiation source and at least one of said optical fibers for transmitting light of specified wavelengths to said temperature-dependent material.

13. Measurement apparatus according to claim 5 further comprising a broad band radiation source and said means for optically sensing said temperature-dependent transition includes two optical detectors, and further comprising first and second filter means respectively interposed between said two detectors and said optical fibers for transmitting light from said temperature-dependent material, said filters respectively filtering light at each of said optical wavelengths.

14. Measurement apparatus as in claim 5 comprising two light-emitting diodes for generating radiation of different wavelengths and means for alternately cyclically energizing said two light-emitting diodes, said means for optically sensing includes a photodiode responsive to the light transmitted by said optical fibers from said temperature-dependent material; said means for determining temperature includes an analog-to-digital convertor responsive to the output from said photodetector, means for storing the output of said analog-to-digital convertor and said means for forming said quotient is a digital dividing circuit for dividing the digital signals representing the respective light signals transmitted from said temperature-dependent material in response to the light radiation from each of said two light-emitting diodes.

* * * * *